United States Patent
Bates et al.

(10) Patent No.: US 6,587,967 B1
(45) Date of Patent: Jul. 1, 2003

(54) DEBUGGER THREAD MONITOR

(75) Inventors: Cary Lee Bates, Rochester, MN (US); Jeffrey Michael Ryan, Byron, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/255,109

(22) Filed: Feb. 22, 1999

(51) Int. Cl.[7] .................................................. G06F 11/00

(52) U.S. Cl. ..................................... 714/35; 714/38

(58) Field of Search ............................. 714/35, 38, 39, 714/41, 42, 47; 717/4; 709/224, 317, 331, 312

(56) References Cited

U.S. PATENT DOCUMENTS

| | | | | |
|---|---|---|---|---|
| 5,142,679 A | * | 8/1992 | Owaki et al. ................ | 395/704 |
| 5,297,274 A | | 3/1994 | Jackson ....................... | 395/500 |
| 5,375,175 A | * | 12/1994 | Kino et al. ..................... | 382/8 |
| 5,438,574 A | * | 8/1995 | Taniguchi ................... | 395/704 |
| 5,632,032 A | | 5/1997 | Ault et al. ................... | 395/670 |
| 5,687,375 A | | 11/1997 | Schwiegelshohn .......... | 395/704 |
| 5,943,498 A | * | 8/1999 | Yano et al. .................. | 395/704 |
| 5,953,530 A | | 9/1999 | Rishi et al. .................. | 395/704 |
| 5,978,937 A | * | 11/1999 | Miyamori et al. ............. | 714/45 |
| 6,009,269 A | * | 12/1999 | Burrows et al. ............. | 395/704 |
| 6,126,328 A | | 10/2000 | Mallory et al. ............. | 395/704 |
| 6,148,381 A | | 11/2000 | Jotwani ....................... | 711/158 |
| 6,202,199 B1 | * | 3/2001 | Wygodny et al. ............... | 717/4 |
| 6,216,237 B1 | | 4/2001 | Klemm et al. ................ | 714/38 |
| 6,256,755 B1 | * | 7/2001 | Hook et al. .................. | 714/718 |
| 6,282,701 B1 | * | 8/2001 | Wygodny et al. ............... | 717/4 |

OTHER PUBLICATIONS

Toledo et al., "Quantitative Performance Modeling of Scientific Computations and Creating Locality in Numerical Algorithms", Massachusetts Institute of Technology, http://www.lcs.mit.edu/, pp. 1–153, Jun. 1995.

Rosenberg, Jonathan B., *How Debuggers Work Algorithms, Data Structures, and Architecture*, New York: Wiley Computer Publishing, (1996), pp. 95–133.

L. Pitt, Probablilistic inductive inference, *ACM*, pp. 383–433, Apr. 1989.

Aral et al., "High–level debugging in parasight", *Proceedings of the ACM SIGPLAN and SIGOPS Workshop on Parallel and distributed debugging*, pp. 151–162, May 1988.

Kessler, "Fast Breakpoints: Design and Implementation", *ACM*, pp. 78–84, Jun. 1990.

(List continued on next page.)

Primary Examiner—Nadeem Iqbal
(74) Attorney, Agent, or Firm—Wood Herron & Evans

(57) ABSTRACT

A computer system, program product and method that monitor the threads executing within a region of a computer program during debugging. This region may be a plurality of nonadjacent sections of code, each with defined entry and exit addresses identified by control points. Some or all threads may be halted depending on a predetermined criteria related to threads of interest or the number of threads executing in the region. Of special interest is monitoring for a thread count so that timing errors may be analyzed for when some plurality of threads simultaneously execute within the region. Moreover, in the illustrative embodiment, control points are implemented for thread monitoring in a manner similar to a break point, utilizing a break point table to determine whether a system exception is due to a break point or to a thread monitor control point. If the latter, program execution continues after storing the thread identifier in a record for the thread monitor control point in the break point table.

20 Claims, 6 Drawing Sheets

OTHER PUBLICATIONS

Savage, "Eraser: A Dynamic Data Race Detector for Multithreaded Programs", *ACM Transactions on Computer Systems*, pp. 391–411, Nov. 1997.

Xu et al., "Dynamic Instrumentation of Threaded Applications", *ACM*, pp. 49–59, 1999.

Ramsey, "Correctness of Trap–Based Breakpoint Implementations", *ACM*, pp. 15–24, Jan. 1994.

Buhr et al., "KDB: a multi–threaded debugger for multi-threaded applications", *ACM*, pp. 80–87, May 1996.

Koch et al., "Breakpoints and Breakpoint Detection in Source Level Emulation", *IEEE*, pp. 26–31, Nov. 1996.

"The Kernel Kit: Semaphores", http://www.sie.co.jp/HTML/DernelKit/sems.htnl; downloaded Dec. 14, 1998, pp. 1–9.

* cited by examiner

| Address 150a | Op Code 150b | Statement Number 150c | Monitor Control Pt 150d | Entry or Exit 150e | Partner 150f | Primary Entry 150g | Monitor Condition 150h | Thread Filtering 150i | Thread Identifiers 150j |
|---|---|---|---|---|---|---|---|---|---|
| 2148711097 | AE | 05 | YES | Entry | | | | | |
| 2148711102 | AJ | 10 | YES | Exit | | | | | |
| 2148711122 | BD | 30 | YES | Entry | | | | | |
| 2148711124 | BF | 32 | YES | Exit | | | | | |
| 2148711129 | BK | 37 | NO | | | | | | |

DEBUGGER THREAD MONITOR

FIELD OF THE INVENTION

The invention is generally related to computers and computer software. More specifically, the invention is generally related to monitoring break points used during debugging software, especially in a multi-threaded software environment.

BACKGROUND OF THE INVENTION

Locating, analyzing and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one, and see the results upon completion of each instruction. While the step operation provides a programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, a second operation supported by conventional debuggers is a break point operation, which permits a computer programmer to identify with a "break point" a precise instruction for which it is desired to halt execution of a computer program during debugging. As a result, when a computer program is executed by a debugger, the program executes in a normal fashion until a break point is reached, and then stops execution and displays the results of the computer program to the programmer for analysis.

Typically, step operations and break points are used together to simplify the debugging process. Specifically, a common debugging operation is to set a break point at the beginning of a desired set of instructions to be analyzed, and then begin executing the program. This debugging of a portion of the computer program allows for systematic development. Once the break point is reached, the program is halted, and the programmer then steps through the desired set of instructions line by line using the step operation. Consequently, a programmer is able to quickly isolate and analyze a particular set of instructions without having to step through irrelevant portions of a computer program.

Most break points supported by conventional debuggers are unconditional, meaning that once such a break point is reached, execution of the program is always halted. Some debuggers also support the use of conditional break points, which only halt execution of a program when a variable used by the program is set to a predetermined value at the time such a break point is reached.

Some operating systems, such as UNIX and Windows NT, allow multiple parts, or threads, of one or more processes to run simultaneously. These operating systems are referred to as multi-threaded. This type of parallel processing allows for faster execution of such processes.

In a multi-threaded program, each thread operates independently, and each thread is capable of reading and/or setting variables. With separate threads setting and reading variables independently of one another, potential conflicts arise with respect to such variables and other shared resources. For example, a program may have a first thread that sets a variable when executing within a first section, and a second thread that reads the variable when executing within a second section. The program may have a different outcome depending on whether or not the first thread sets the variable before the second thread reads the variable. For example, if the program was designed with the assumption that the first thread would set the variable before the second thread reads the variable, then an unpredictable result can occur, possibly corrupting data or crashing the program, when the second threads reads the variable first. Locating faults related to the multiple threads of control may not be apparent with the aforementioned approach to debugging; halting execution each time a thread executes at a break point at each section may not readily duplicate the condition if the simultaneous execution of the two threads is rare. The user would have to repeatedly execute the program to possibly see the overlap.

In addition, in some situations a programmer may only be interested in monitoring specific threads executing in a particular region. Using conventional debugging tools, the programmer would have to halt program execution each time a thread entered the region to analyze the thread activity, regardless of whether the programmer was monitoring that thread. A conventional thread tracing tool could be used in some instances to see a large amount of data pertaining to thread activity in numerous areas of the code. However, in such situations the programmer would be forced to sift through the large amount of data in order to see the region and threads of interest.

Therefore, a significant need exists for monitoring the number of threads or specific threads simultaneously executing within a computer program so that multi-threaded applications can be debugged more readily.

SUMMARY OF THE INVENTION

The invention addresses these and other problems associated with the prior art by providing an apparatus, program product, and method of executing a portion of a multi-threaded program and monitoring threads that are executing within a selected monitored region in the program while the portion of the program is executing.

By monitoring threads within a region consistent with the invention, a number of advantages are realized. For example, the user may be able to monitor the performance of the program based on specific threads being in a region. Also, confirmation may be provided that threads of interest did not simultaneously execute in a region. The user may also be informed about some given number of threads simultaneously executing in the region, e.g., to permit the user to evaluate what occurs when the plurality of threads simultaneously execute within a region. This list is for illustration only and is not all inclusive.

Once thread monitoring is established, this capability may enhance a debug user interface in a number of possible manners. Threads executing within a monitored region may be highlighted while program execution continues. A listing of the threads executing within a monitored region may be stored for later use. Also, program execution may be halted once a monitor condition is triggered, such as a threshold count of threads being exceeded by threads in the region. Alternatively, the threads to be monitored may be filtered, such as by specifying threads to be included or excluded.

Thus, threads displayed, or threads triggering a monitor condition may be based on these filtered threads, such as a predetermined list of filtered threads being detected simultaneously executing in the region.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there are described various embodiments of the invention.

BRIEF DESCRIPTION OF THE DRAWINGS

FIG. 8 is a data structure of a break point table corresponding to the region of FIG. 7.

DETAILED DESCRIPTION

Debugging multi-threaded computer programs is aided by monitoring specific threads and/or the number of threads simultaneously executing within a region of interest in a computer program. In addition, thread activity monitoring allows for enhanced presentation of thread activity during or after program execution. Moreover, program execution may be conditionally halted depending on the monitored thread activity.

The user can specify one or more sections of one or more computer programs for which thread activity is to be monitored. These sections are herein collectively referred to as a monitored region. This region may be comprised of one or more sections of program code, each section defined by partnering an entry point and an exit point. Typically, sections are separated from each other, although juxtaposing or overlapping sections would not prevent monitoring. Thread monitor control points are associated with these entry and exit points. Thus, when a thread hits a entry or exit control point, the status of monitored threads is updated to reflect that this thread is entering or leaving the region, respectively. Control points also include other points inserted into the computer program to affect execution during debugging, especially break points. Consequently, reference hereafter will be made to determination as to whether a control point was a monitor control point or a break point, for instance. It should be appreciated that multiple monitored regions may be monitored in some embodiments.

Figure 1:
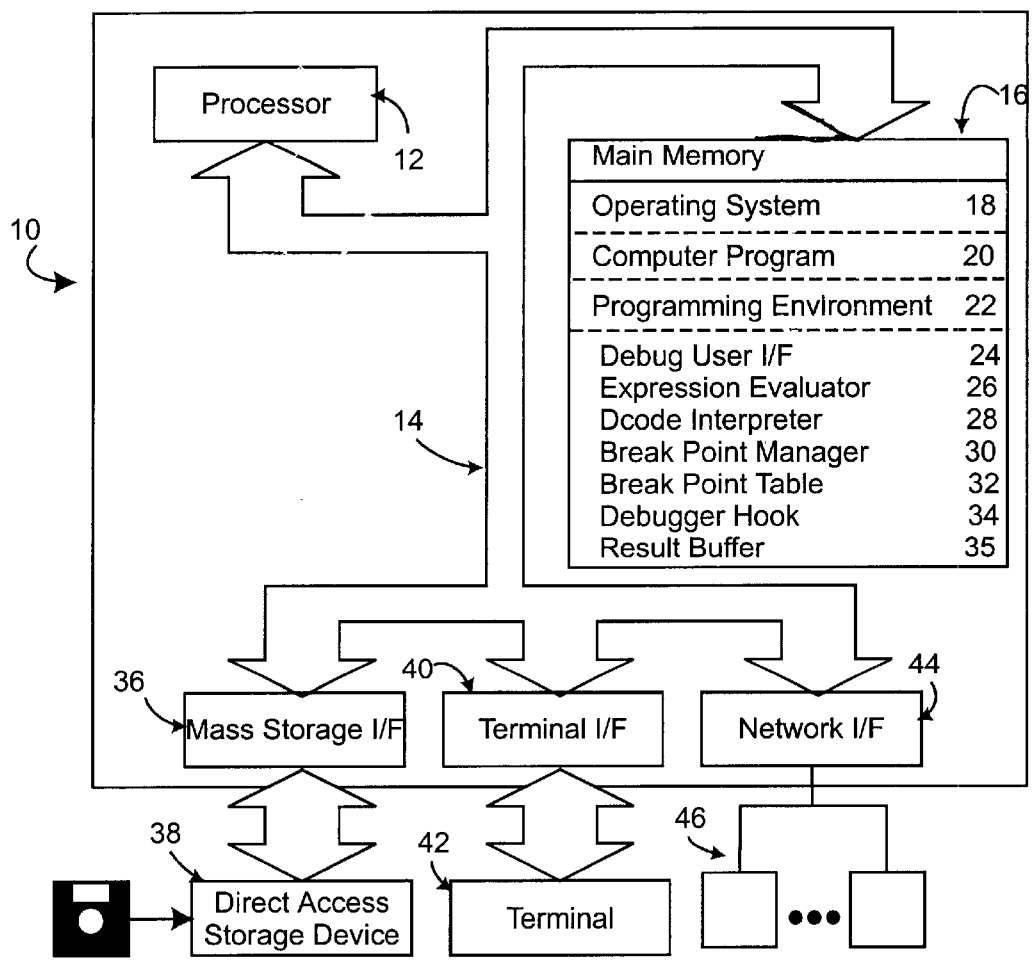
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is shown for a multi-user programming environment that includes at least one processor 12 which obtains instructions, or op codes, and data via a network 14 from a main memory 16. The processor 12 could be a PC-based server, a minicomputer, a midrange computer, a mainframe computer, etc. The main memory 16 includes an operating system 18, a computer program 20, and a programming environment 22. The programming environment 22 provides a way to debug the computer program 20, or computer code, by providing tools for locating, analyzing and correcting faults. One such tool is thread monitoring. As will be shown below, this thread monitoring tool is provided by the cooperation of a debug user interface 24, expression evaluator 26, dcode interpreter 28, break point manager 30, break point table 32, debugger hook 34, and result buffer 35.

It should be appreciated that the main memory 16 could be one or a combination of memory devices, including Random Access Memory, nonvolatile or backup memory (e.g., programmable or Flash memories, read-only memories, etc.). In addition, memory 16 may be considered to include memory storage physically located elsewhere in computer system 10, e.g., any storage capacity used as virtual memory or stored on a mass storage device or on another computer coupled to computer system 10 via network 14.

The computer system 10 could include a number of operators and peripheral systems as shown for example by a mass storage interface 36 operably connected to a direct access storage device 38, by a terminal interface 40 operably connected to a terminal 42, and by a network interface 44 operably connected to a plurality of networked devices 46. The terminal 42 and networked devices 46 could be desktop or PC-based computers, workstations, or network terminals, or other networked computer systems.

For purposes of the invention, computer system 10 may represent practically any type of computer, computer system or other programmable electronic device, including a client computer, a server computer, a portable computer, an embedded controller, etc. The computer system 10 may be a standalone device or networked into a larger system.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 2:
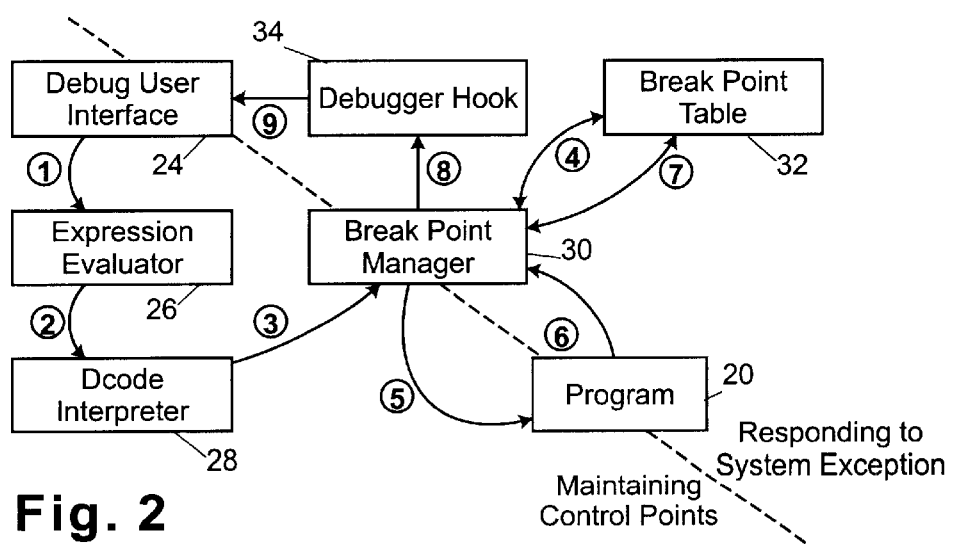
FIG. 2 is a block diagram of an exemplary software environment for the computer system of FIG. 1.

Referring to FIG. 2, an exemplary software environment is shown for the computer system 10 of FIG. 1. Specifically, thread monitoring capability is illustrated in block diagram form, with the elements shown that contribute to maintaining control points (e.g., creating and deleting) and to responding to a system exception. The debug user interface 24, which may be a third-party debugging program, is shown initiating the process, providing at Phase 1 any control points to be established. For example, a debugger command is made setting a monitored region or a break point. In some instances, the user may define these control points by referring to high-order language (HOL) references such as statement numbers or software object references such as a program or module name, from which the physical storage address may be cross referenced. The illustrative embodiment described below shows a user providing statement number references from which memory addresses are cross referenced.

At Phase 2, this debugger command is parsed by the expression evaluator 26 that uses a table that was produced by a compiler stored with the computer program 20 to parse the debugger command and produce a dcode program. This dcode program contains commands to establish the monitored region. The dcode interpreter 28 at Phase 3 passes on the control point information to the break point manager 30, which in turn updates the break point table 32 at Phase 4. At Phase 5, the dcode interpreter 28 runs a dcode program to control the break point manager 30 to set the control points.

After the control points are set, user provides an input that resumes execution of the program 20. As represented at Phase 6, execution of the program results in an encounter of a control point. In the illustrative embodiment, this is accomplished by an invalid instruction in the program 20 causing a system exception. An interrupt handler, or similar means, passes information regarding the exception or interrupt to the break point manager 30. The break point manager 30 references and updates the breakpoint table 32 at Phase 7 as required in order to determine what type of control point was encountered and the associated processing. Then, at Phase 8, the break point manager 30 utilizes the debugger hook 34 in order to obtain debugger commands, especially when a break point has halted program execution. The debugger hook 34 prompts the debug user interface 24 at Phase 9. The additional step of the debugger hook 34 is illustrated for instances where an interface is required between the user interface 24 and the other portions of the programming environment 22. The debugger hook 34 may send the results to the user interface 24, or otherwise hold the results, such as utilizing the result buffer 35 to cache data for the debug user interface 24.

Figure 3:
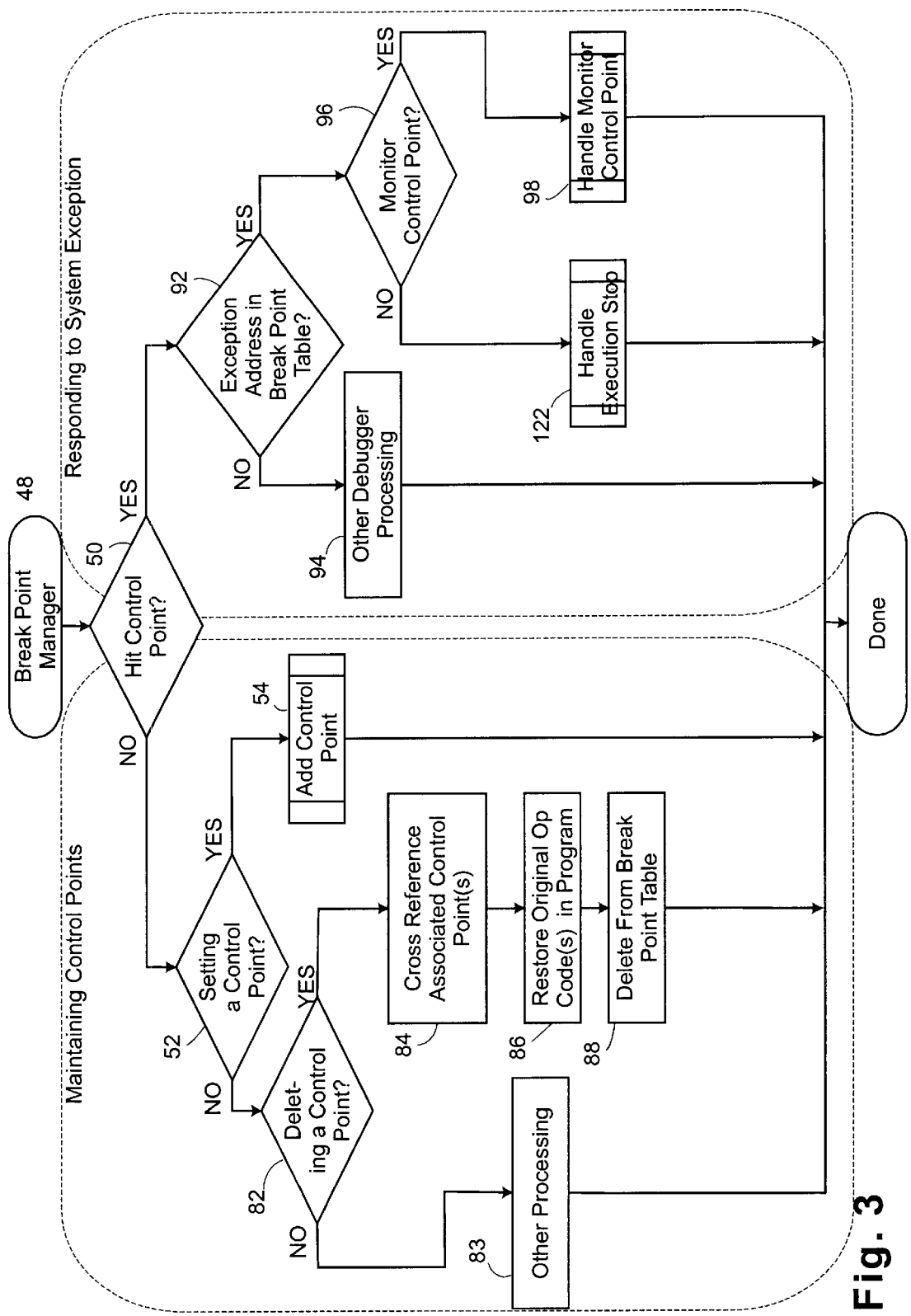
FIG. 3 is a flow diagram of a break point manager routine performed on the computer system of FIG. 1.

Referring to FIG. 3, a break point manager routine 48 is illustrated for maintaining control points and responding to a system exception, although the break point manager may include other routines. First, a determination is made as to whether a control point has been hit during program execution (block 50). If a control point was not hit in block 50, then a determination is made as to whether a debugging command has been made to set a control point (block 52). If a control point is to be set in block 52, then an add control point routine 54 is performed.

Figure 4:
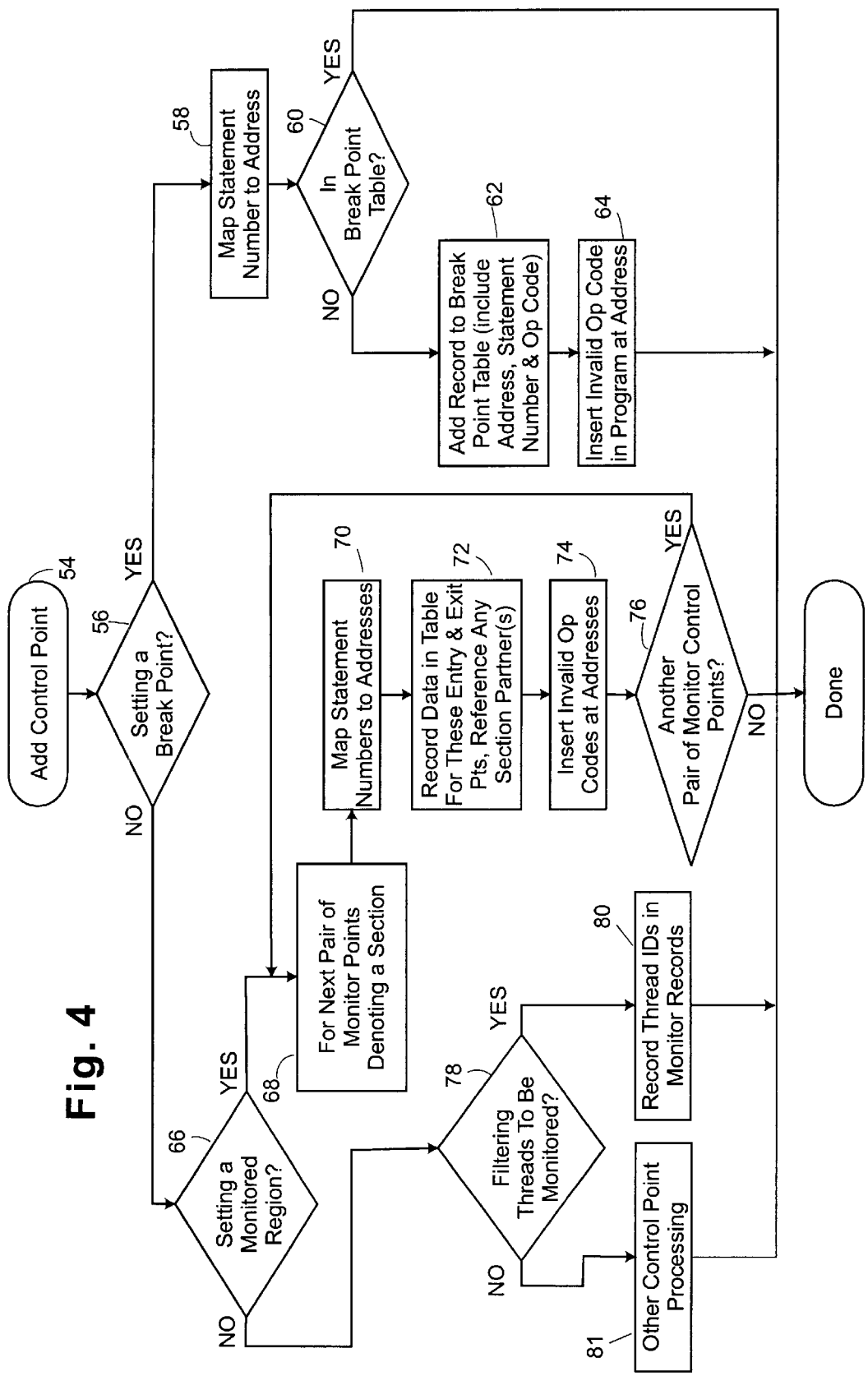
FIG. 4 is a flow diagram of the add control point routine referenced in FIG. 3.

Referring to FIG. 4, the add control point routine 54 referenced in FIG. 3 first determines whether the control point to be set is a break point (block 56). If it is, then the statement number provided for inserting the break point is cross referenced to a table generated by the compiler and stored with the computer program 20 to find the corresponding physical memory address (block 58). Then, the break point table 32 is referenced to see if the break point is already inserted (block 60). If it is, then routine 54 is done. If in block 60 the break point is not in the break point table 32, then a record is added to the break point table 32, including characteristics of the break point including the original op code at that address, the address and optionally the statement number (block 62). Then an invalid op code is inserted into the actual computer program 20 at the address to act as the control point (block 64) and routine 54 is done.

Returning to block 56, if the control point to be added was not a break point, then a determination is made as to whether a monitored region of code is to be set (block 66). If a monitored region is to be set, then a plurality of records are created (blocks 68–76) so that the boundaries are established in the break point table 32. In block 68, a pair of monitor control points, entrance and exit, denoting a section are obtained from the debugger user interface 24. These statement numbers that are defined to be entrance and exit control points are mapped to physical memory addresses by referring to a cross reference table created by the compiler front-end when compiling the computer program 20 (block 70). Records for these control points are created in the break point table 32, including cross references to each other and to other partner sections comprising the monitored region (block 72). Then, invalid op codes, or instructions, are substituted at the addresses mapped to the monitor control points (block 74). Then a determination is made as to whether the region includes another pair of monitor control points for another section of code to be monitored (block 76). If another pair of monitor control points remains, then processing returns to block 68, else routine 54 is done.

Returning to block 66, for the case when a monitored region is not being set, then a determination is made if it is desired to filter a thread from monitoring (block 78). Typically, if not specified, all threads are to be monitored. If in block 78 threads were specified, then thread identifiers for any specified threads are recorded in monitor records (block 80). Such records could specify threads to be ignored when hitting a control point or threads to be included. Then routine 54 is done. Returning to block 78, if threads are not being filtered, then other control point processing is performed (block 81). For example, control points may be included for functions other than break points and monitor control points. Then, routine 54 is done.

Returning to FIG. 3 at block 52, if a control point was not to be set, a determination is made as to whether a debugging command has been made to delete a control point (block 82). If no deletion of a control point is determined in block 82, then other debugging processing may occur responsive to the command (block 83), and routine 48 is done.

If in block 82, deletion of a control point was commanded, then the control point is deleted singularly such as in the case of a break point or in one or more pairs of associated control points in the case of a monitored region. The latter entails an entry or exit control point being partnered together. Also, a region comprised of a plurality of sections, each having an entry and exit control point, would have partnership between the section pairs of control points. First, the break point table 32 is referenced to obtain the stored original op code that was replaced in the computer program 20 with the control point (block 84), and this original op code is restored to the computer program 20 (block 86). Then, the record in the break point table 32 is deleted for the control point (block 88). When deleting a plurality of control points, a number of ways are appropriate for locating the associated control points. For example, the user command can list all control points. Also, each record can have a cross-reference to associated control points or a primary control point and the break point table can be scanned for all monitor control points. Alternatively, the monitor control points may be stored in a linked circular list whereby following the list results in finding all monitor control points. It will be appreciated that this list is exemplary and not all inclusive.

Returning to block 50 for the case where the break point manager routine 48 has been prompted by a hitting a control point, then processing occurs to respond to the system exception. Reference is made to the break point table 32 to determine whether the system exception is a control point by determining whether the exception address is in the break point table 32 (block 92). If the system exception is not a control point, then other debugger processing occurs (block 94). Then routine 48 is done.

If, at block 92, the system exception is found to be a control point, then a determination is made as to whether the control point is further a monitor control point (block 96). If the control point is a monitor control point, then the monitor control point is handled (block 98), else the execution stop is handled (block 122), and routine 48 is done.

Figure 5:
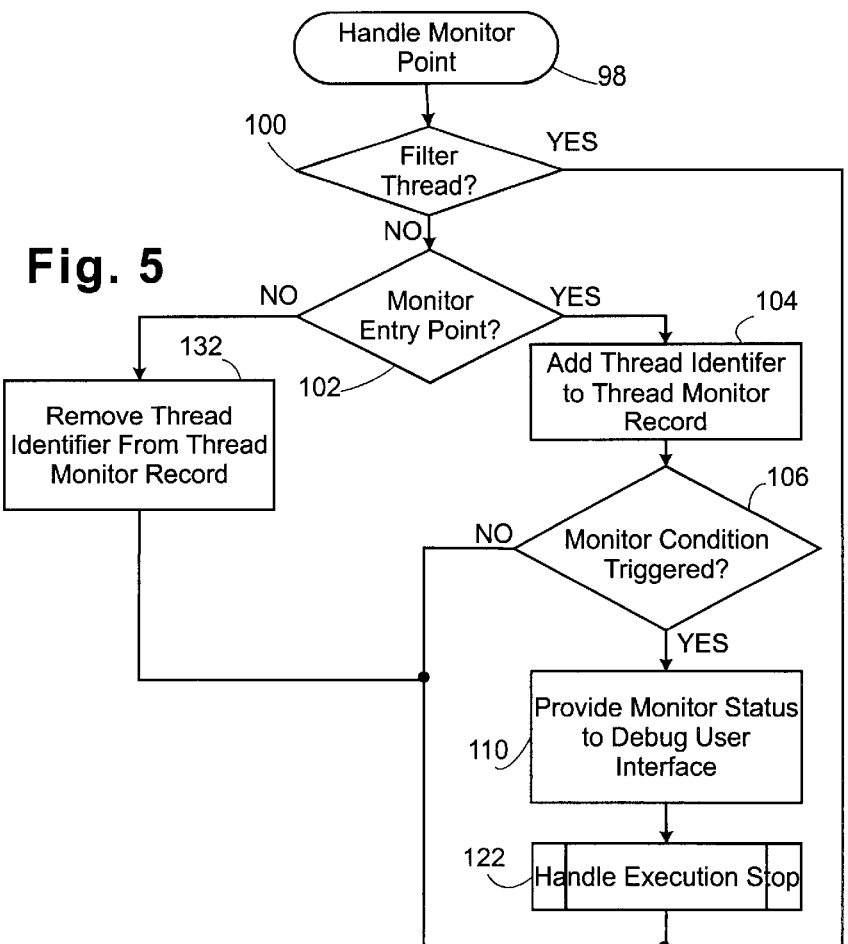
FIG. 5 is a flow diagram of the handle monitor point routine referenced in FIG. 3.

Referring to FIG. 5, the handle monitor control point routine 98, referenced in FIG. 3, is illustrated. Routine 98 tracks threads currently within a monitored region and processes action required by a monitor condition being triggered. In block 100, the thread that hit the monitor control point is filtered, that is, reference is made as to whether this thread is excluded from monitoring. If the thread is to be filtered (i.e., excluded), then the thread is unsuspended by emulating the original op code stored in the break point table 32 (block 108) and routine 98 is done. If the thread is not to be filtered, then a determination is made as to whether the monitor control point is a monitor entry point into a section of the monitored region (block 102). If the monitor control point is an entry point, then a thread identifier for the region is stored (block 104). As an example of a simple embodiment, this thread identifier may only be a thread count. In other embodiments, especially where threads are filtered such as described herein, then the stored thread identifier may uniquely identify the thread. Then a determination is made in block 106 whether a monitor condition has been triggered by this thread entering the region. For the example of the stored thread identifiers being merely a thread count, this monitor condition may be a count threshold, such the monitor condition is triggered when two threads are executing within the region.

Alternatively, block 104 and 106 could implement a monitor, or plurality of monitors, depending on specific threads. For example, a condition could be made for thread A entering the region when thread B is not within the region. Many conditions could be constructed in block 106, for which the requirements for storage of information in block 104 would be affected.

If the monitor condition has not been triggered in block 106, then program execution is allowed to continue by emulating the original op code stored in the break point table 32 (block 108), and routine 98 is done. If the monitor condition has been triggered in block 106, then monitor status is provided to the debug user interface (block 110). Typically, recorded thread identifiers or thread counts for the monitored region are cleared at this point or otherwise prior to recommencing program execution. Further processing is then handled like a break point, halting execution by handling execution stop (block 122) and then unsuspending the thread or threads as commanded in routine 122 by emulating the original op code (block 108).

Returning to block 102 for when the monitor control point is not an entry point, then by implication the control point is an exit point. The thread identifier is thus removed (block 132), the original op code is emulated to unsuspend the thread (block 108), and routine 98 is done. If the thread identifier is merely a thread count, then this removal of the thread identifier involves decrementing the thread count. If the monitor condition is conditioned on something other than a count, then block 132 would entail additional record keeping pertaining to the thread exiting the region.

Figure 6:
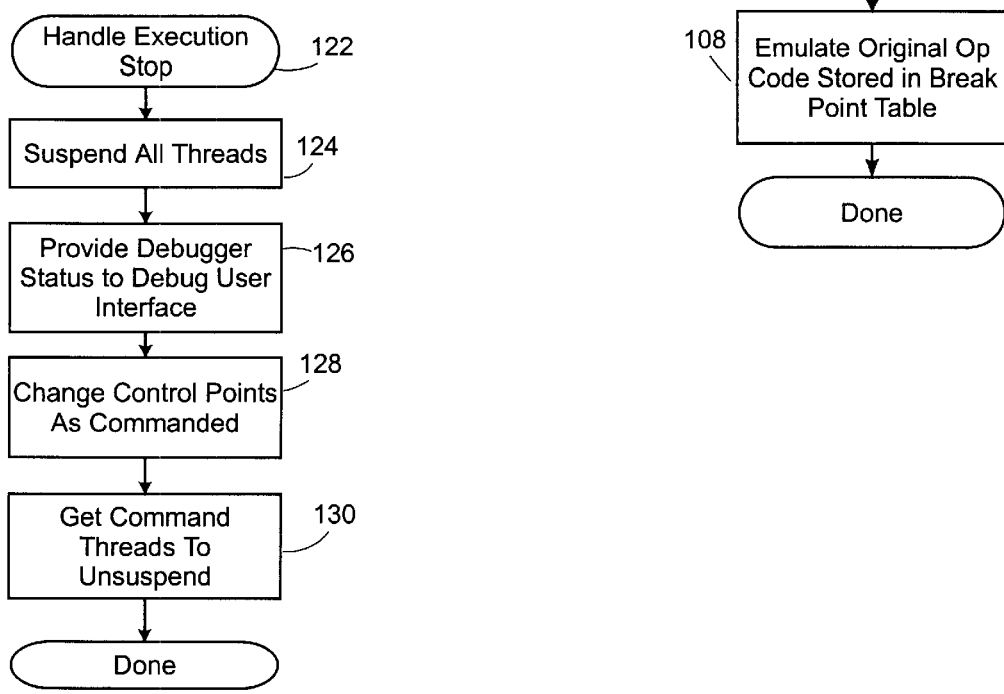
FIG. 6 is a flow diagram of the handle execution stop routine referenced in FIG. 3.

Referring to FIG. 6, the handle execution stop routine 122 is illustrated. First, all threads are suspended (block 124). Debugger status is provided to the debug user interface so that the user can evaluate the data about the program 20 and make debugger commands (block 126). For example, the user may command a change in the control points (block 128) to monitor a different region. Typically, program execution is commanded by unsuspending some or all threads, so in block 130, routine 122 gets the command to unsuspend a thread or threads. In some embodiments, then all control points are cleared from the break point table, or otherwise reset, and all threads are unsuspended and allowed to resume. Then routine 122 is done.

Figure 7:
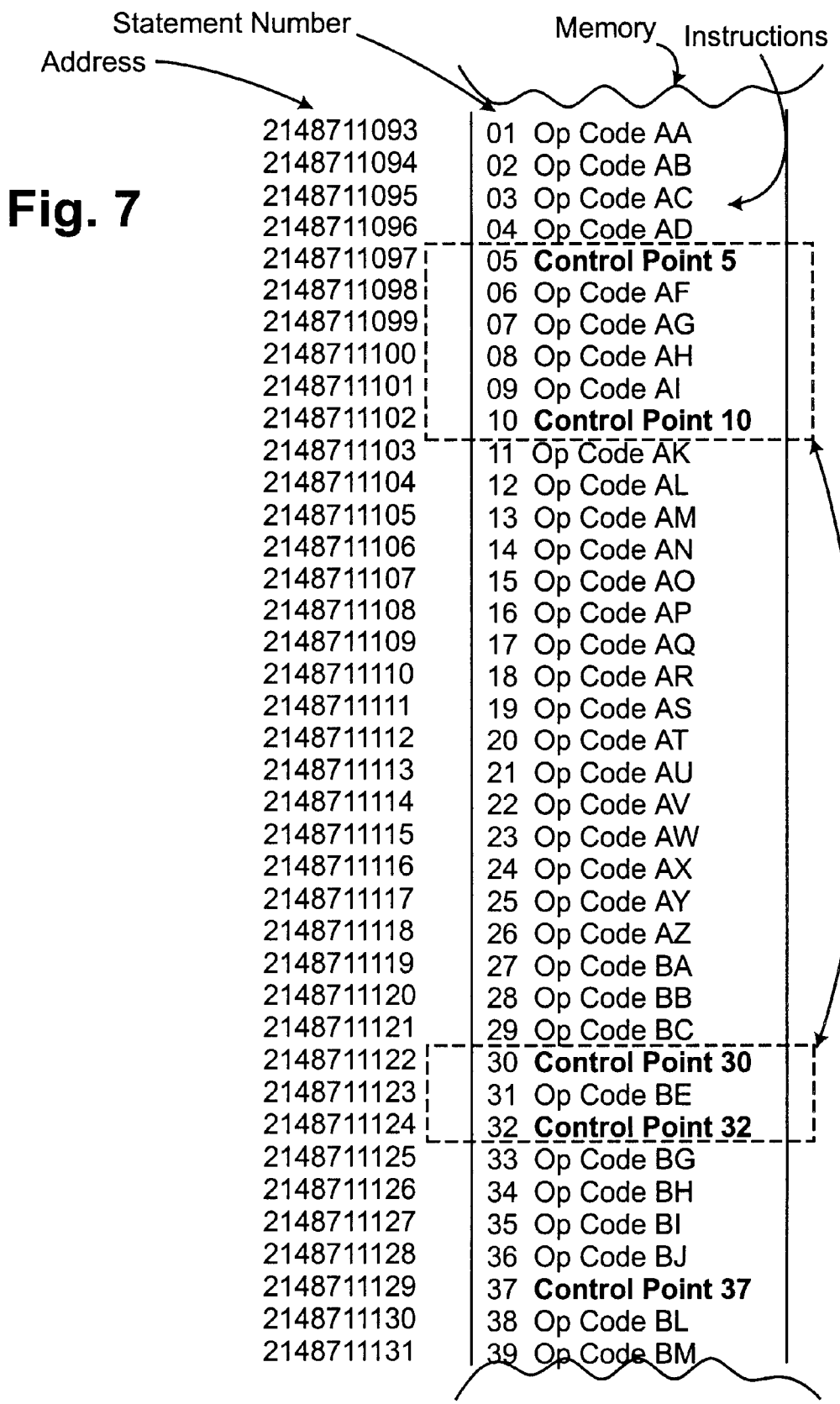
FIG. 7 is an illustrative example of a monitored region consistent with the invention.

Referring to FIG. 7, an illustrative example is provided of a monitored region of two sections defined by statement number control points 05, 10 and 30, 32 respectively. These control points correspond to addresses 2148711097, 2148711102, 21448711122, and 2148711124 respectively. Also, a break point is shown at statement number 37, corresponding to address 214871129.

Referring to FIG. 8, these control points are recorded in a break point table 32 including a plurality of fields. First, an "Address" field 150a stores the physical address for the statement or storage location for a variable so that a system exception at that address can be associated with a control point. Second, an "Op Code" field 150b stores the original op code from the program 20 when replaced with an invalid instruction to generate a system exception. Third, a "Statement Number" field 150c stores a statement number for communicating with the user when a statement number for the computer program 20 is used rather than the actual storage address. Fourth, a "Monitor Control Point" flag 150d may be used to denote whether the control point is a monitor control point. Fifth, an "Entry or Exit" field 150e describes whether a monitor control point defines an entry or exit point of a section. Sixth, a "Partner" field 150f cross references the record for the other corresponding control point for a section. Seventh, a "Primary Entry" field 150g cross references all of the control points defining a monitored region. Eighth, a "Monitor Condition" field 150h provides the test required for performing a user interface action in response to thread activity. Ninth, a "Thread Filtering" field 150i allows for excluding threads not to be monitored. Tenth, a "Thread Identifiers" field 150j records the count or identifiers for threads being monitored in the region. During program execution, a count or listing of threads for the monitored region would be updated, and perhaps displayed. Alternatively, the specific thread identifiers for threads in the region could be stored.

Another embodiment of the invention would include a plurality of monitored regions, each with independent thread monitoring processes. Moreover, these regions could be overlapping. If more than one user is responsible for the monitored regions, then masking would be employed so that other users do not "see" monitored regions set by another. This masking could be accomplished by including in the break point table data regarding a user or process initiating the monitored region.

In another embodiment, a plurality of conditions could be included that would be deemed to exceed the monitor threshold. For example, the monitor would be exceeded if there are more threads in the region or thread B enters the region when thread A was already in the region.

Although the illustrative embodiment contemplates only one control point assigned to an address, a plurality of control points could share the address. The break point manager 30 would then check for multiple records and make a determination as to what monitored regions are affected.

Other modifications will be apparent to one of ordinary skill in the art. Therefore, the invention lies solely in the claims hereinafter appended.

What is claimed is:

1. A method of monitoring execution of a program on a computer system comprising:

executing a portion of the program, the program including a plurality of threads, wherein each of the plurality of threads includes a thread identifier;

monitoring the threads that are executing within a selected monitored region in the program while the portion of the program is executing, including storing the thread identifiers for the threads that are executing within the selected monitored region; and suspending all threads when the stored thread identifiers exceeds a monitor threshold.

2. The method of claim 1, further comprising selecting a region from the program to be monitored in response to user input.

3. The method of claim 1, further comprising terminating execution of the portion of the program in response to encountering a break point in the program.

4. The method of claim 1, further comprising designating threads that are to be monitored, and wherein monitoring the threads further comprises disregarding threads other than designated threads.

5. The method of claim 1, wherein the selected monitored region comprises a first section and a second section.

6. The method of claim 5, wherein the first section is separated from the second section.

7. The method of claim 1, further comprising selectively unsuspending the suspended threads in response to user selection.

8. The method of claim 1, further comprising providing a monitor status to a user when the stored thread identifiers exceeds the monitor threshold.

9. A method of monitoring execution of a program on a computer system comprising:

executing a portion of the program, the program including a plurality of threads; and monitoring the threads that are executing within a selected monitored region in the program while the portion of the program is executing, wherein the selected monitored region includes a monitor entry point and monitor exit point, and wherein executing the portion of the program includes:

locating an entry address for an entry to the selected monitored region in the program;

storing an entry op code found at the entry address;

storing an entry monitor point at the entry address, the entry monitor point configured to be an instruction that will interrupt execution of the program;

locating an exit address for an exit to the selected monitored region in the program;

storing an exit op code found at the exit address; and storing an exit monitor point at the exit address, the exit monitor point configured to be an instruction that will interrupt execution of the program.

10. The method of claim 9, wherein the entry and exit monitor points are invalid op codes that generate a system exception to interrupt execution of the program.

11. The method of claim 10, wherein monitoring the threads is accomplished by storing a thread identifier upon encountering an entry monitor point and by removing a thread identifier upon encountering an exit monitor point.

12. The method of claim 11, further comprising allowing the execution of the portion of the program to continue when the stored thread identifiers do not trigger the monitor condition by emulating the entry op code after encountering the entry monitor point and by emulating the exit op code after encountering the exit monitor point.

13. The method of claim 1, wherein storing a thread identifier comprises incrementing a thread count, and wherein removing a thread identifier comprises decrementing a thread count.

14. An apparatus comprising:

a memory;

a first program, resident in the memory, the first program including a plurality of threads, wherein each of the plurality of threads includes a thread identifier; and a second program, resident in the memory, the second program configured to select a region from the first program to be monitored in response to user input, to execute a portion of the first program, to monitor the threads that are executing within the selected monitored region in the first program, to store the thread identifiers for the threads that are executing within the selected monitored region, and to suspend all threads when the stored thread identifiers exceeds a monitor threshold.

15. The apparatus of claim 14 wherein the second program is configured to monitor the threads with a plurality of control points inserted into the first program.

16. An apparatus comprising:

a memory;

a first program, resident in the memory, the first program including a plurality of threads;

a second program, resident in the memory, the second program configured to execute a portion of the first program and to monitor the threads that are executing within a selected monitored region in the first program, wherein the second program is configured to monitor the threads with a plurality of control points inserted into the first program; and a table configured to define the plurality of control points, wherein the second program references the table to process a control point encountered during execution of the first program.

17. The apparatus of claim 15 wherein the each of the plurality of control points comprise an invalid instruction.

18. A program product, comprising:

a first program configured to execute a portion of a multi-thread program of the type including a plurality of threads, wherein each of the plurality of threads includes a thread identifier; the first program further configured to select a region from the multi-thread program to be monitored in response to user input, to monitor the threads that are executing within the selected monitored region in the multi-thread program, to store the three identifiers for the threads that are executing within the selected monitored region, and to suspend all threads when the stored thread identifiers exceeds a monitor threshold; and a signal bearing media bearing the first program.

19. The program product of claim 18, wherein the signal bearing media includes transmission type media.

20. The program product of claim 18, wherein the signal bearing media includes recordable media.

* * * * *